Nov. 30, 1965      C. O. LARSON      3,220,679

ASSEMBLIES FOR MOUNTING MOULDINGS ON UTILITY POLES

Filed June 19, 1964

Inventor
Charles O. Larson
By
Prangley, Baird, Clayton, Miller & Vogel.
Attys.

United States Patent Office 3,220,679
Patented Nov. 30, 1965

3,220,679
ASSEMBLIES FOR MOUNTING MOULDINGS ON UTILITY POLES
Charles O. Larson, Sterling, Ill., assignor to Chas. O. Larson Co., Sterling, Ill., a corporation of Illinois
Filed June 19, 1964, Ser. No. 376,470
2 Claims. (Cl. 248—71)

The present invention relates to mounting structures, and particularly to an assembly for mounting a moulding on a utility pole.

It is an important object of the present invention to provide an improved assembly for mounting a moulding on a utility pole of generally circular cross section wherein the moulding has a generally convexly curved exterior surface, the asembly firmly holding the moulding in watertight relationship with respect to the utility pole to provide an automatic tight fit therebetween upon the mounting of the moulding using the improved mounting assembly.

Another object of the invention is to provide an improved mounting assembly for mounting a moulding on a utility pole, wherein the fasteners forming a part of a mounting assembly resist inadvertent and unwanted withdrawal thereof, thus firmly to hold the moulding against the associated utility pole.

Yet another object of the invention is to provide a mounting assembly of the type set forth comprising a strap formed of bendable material and including a curved bendable central portion having a normal radius of curvature greater than the radius of curvature of the exterior surface of the associated moulding, an attachment flange on each end of the holding portion and disposed at on obtuse angle with respect to each other and with respect to said holding portion, each of the attachment flanges having an opening therein and receiving a fastener engageable in the associated utility pole to mount the strap upon the utility pole, the driving of the fasteners into the utility pole drawing the strap about the moulding and bending the holding portion so that the radius of curvature thereof is substantially equal to that of the exterior surface of the moulding to place the inner surface of the holding portion against the exterior surface of the moulding throughout the adjacent areas thereof and to place the attachment flanges substantially tangent to the exterior surface of the utility pole, the axes of the fasteners being disposed substantially normal to the associated attachment flange and radially with respect to the associated utility pole, thus firmly to clamp the moulding against the utility pole.

Still another object of the invention is to provide an improved mounting assembly of the type set forth wherein the strap is formed of a substantially flat bendable sheet metal, the curved bendable central holding portion having a reinforcing rib extending the length thereof and disposed substantially centrally thereof to provide reinforcement therefor.

Yet another object of the invention is to provide an improved mounting assembly of the type set forth wherein prongs are provided on the attachment flanges for digging into the utility pole more firmly to mount the strap thereon.

In connection with the foregoing object, it is another object of the invention to form the prongs by striking them from the material of the attachment flanges so that the prongs extend away from the holding portion and are attached adjacent to the openings in the attachment flanges so as to guide the fasteners in the desired direction into the utility pole during the driving thereof.

A further object of the invention is to provide an improved mounting assembly of the type set forth, wherein the holding portion of the strap is substantially circular in cross section.

Further features of the invention pertain to the particular arrangement of the parts of the mounting assembly whereby the above-outlined and additional operating features thereof are attained.

The invention, both as to its organization and method of use, together with further objects and advantages thereof, will best be understood by reference to the following specification taken in connection with the accompanying drawing, in which.

Figure 1:
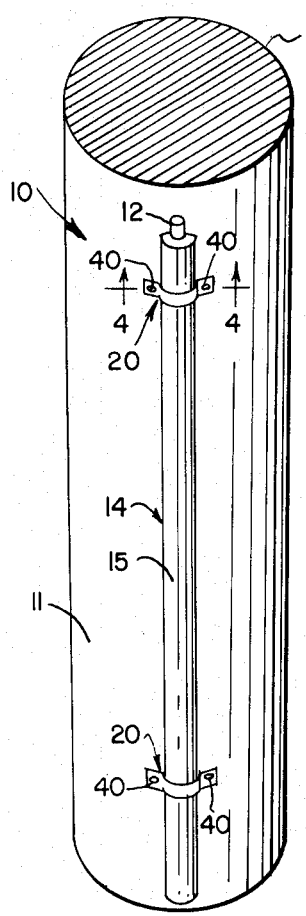
FIGURE 1 is a perspective view of a section of a utility pole showing a conductor and associated moulding mounted thereon using the mounting assembly of the present invention.

Referring to FIG. 1 of the drawings, there is illustrated a portion of a utility pole 10 having a ground conductor 12 held thereon by a moulding 14 that is in turn mounted upon the utility pole 10 by a mounting assembly made in accordance with and embodying the principles of the present invention, the mounting assembly including a mounting strap generally designated by the numeral 20 and a pair of fasteners 40. The utility pole 10 is typically formed of wood and tapers from the bottom thereof upwardly, i.e., the larger end thereof is disposed in the ground and the smaller end thereof is disposed a substantial distance above the ground, the utility pole 10 at any point having a generally circular cross section to provide a generally circular outer surface as indicated at 11. Conductors that are to be mounted upon the side of the utility pole 10, such as the ground conductor 12, are held therein by a moulding such as the moulding 14 which is also typically formed of wood, but also can be formed of a synthetic organic plastic resin. The moulding 14 has an outer surface 15 which is formed substantially as half of a cylinder and is generally semi-circular in cross section and has a groove on one side thereof generally designated by the numeral 16 and adapted to receive therein an object such as the conductor 12 so as to hold the conductor 12 against the outer surface 11 of the utility pole 10, the moulding 14 being provided with abutment surfaces 17 on either side of the groove 16 adapted to engage against the outer surface 11 of the utility pole 10 to provide a tight fit therewith.

Figure 2:
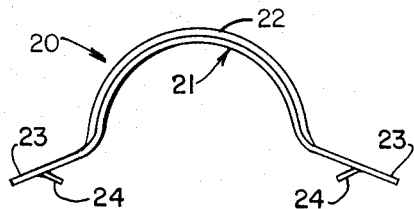
FIG. 2 is a side elevational view of the strap forming a part of the mounting assembly of the present invention.
Figure 3:
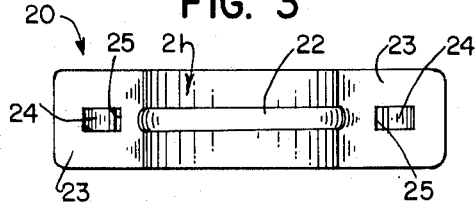
FIG. 3 is a plan view of the underside of the strap illustrated in FIG. 2.

The construction of the strap 20 is best illustrated in FIGS. 2 and 3 of the drawings; the strap 20 is preferably formed of a rectangular piece of bendable sheet metal that is shaped to provide the structure illustrated in FIGS. 2 and 3. More specifically, the strap 20 includes a central holding portion 21 which is curved as is best seen in FIG. 2, the radius of curvature of the holding portion 21 being greater than the radius of curvature of the outer surface 15 of the associated moulding 14 with which the strap 20 is to be used. The arcuate extent of the holding portion 21 is approximately 180° and the width thereof may be, for example, ¾". A reinforcing rib 22 is provided along substantially the entire length of the holding portion 21 to provide for stiffening and reinforcing thereof without unduly interfering with the bendable character thereof for reasons which will be more fully understood hereinafter. Each end of the holding portion 21 is provided with an integral attachment flange 23, the flanges 23 being substantially planar and being disposed at an obtuse angle with respect to the holding portion 21 and at an obtuse angle with respect to each other. Disposed substantially centrally of each of the attachment flanges 23 is a tab or prong 24 struck from the material of the attachment flange 23 and extending therefrom in the direction opposite to the holding portion 21 and directed toward the other one of the atttachment flanges 23. The shape of the prongs 24 is substantially rectangular, see FIG. 3, and they are generally curved. The striking out of the prongs 24 from the attachment flanges 23 serves to provide a fastener receiving opening 25 in each of the attachment flanges 23 for receiving the fasteners 40 therethrough.

Figure 4:
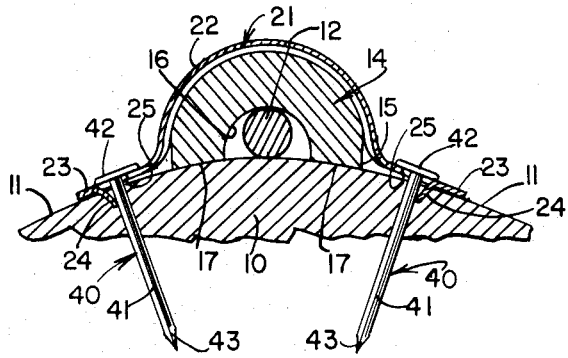
FIG. 4 is an enlarged view in horizontal section with certain portions broken away through the assembly illustrated in FIG. 1 substantially as seen in the direction of the arrows along the line 4—4 thereof.

As is best seen in FIG. 4 of the drawings, the fasteners 40 are in the form of nails including elongated shanks 41 which are provided at one end thereof with an enlarged head 42 and at the other end thereof the usual point 43. Two of the nails 40 have been provided, each extending through one of the openings 25 in the associated attachment flange 23 of the strap 20.

In mounting the strap 20 upon the utility pole 10, it is first placed in general embracing relationship with respect to the associated moulding 14. One of the nails 40 is then inserted through the associated opening 25 in the attachment flange 23, the prong 24 serving to guide the nail 40 toward the correct position thereof with respect to the utility pole 10 and the attachment flange 23; more specifically, the nail 41 is driven so that the longitudinal axis thereof is substantially perpendicular to the associated attachment flange 23 and substantially radially oriented with respect to the utility pole 10, whereby the attachment flange 23 is disposed against the outer surface 11 of the utility pole 10 and substantially tangent thereto. As a result of the driving of the nail 40, the prong 24 will also be driven into the surface 11 of the utility pole 10. The second nail 40 is driven in a like manner, being guided into the proper position by means of the associated prong 24, the longitudinal axis of the second nail 40 being disposed normal to the associated attachment flange 23 and oriented radially with respect to the utility pole 10, whereby the associated attachment flange 23 is disposed substantially tangent to the surface 11 of the utility pole 10.

During the driving of nails 40, the holding portion 21 of the strap 20 is generally bent about the outer surface 15 of the moulding 14 until the radius of curvature of the holding portion 21 is substantially equal to the radius of curvature of the outer surface 15 of the moulding 14. When the nails 40 are finally driven home into the utility pole 10, the inner surface of the holding portion 21 of the strap 20 is placed firmly against the outer surface 15 of the moulding 14 throughout the adjacent areas thereof and the attachment flanges 23 are disposed generally tangent to the exterior surface 11 of the utility pole 10.

With the mounting assembly in position upon the utility pole 10 as illustrated in FIGS. 1 and 4, the surfaces 17 of the moulding 14 are firmly urged into a tight fitting relationship with the outer surface 11 of the utility pole 10, and when the contacting surfaces are sufficiently smooth, the joint therebetween is essentially watertight. The angled position of the nails 40 with respect to the utility pole 10 firmly resists pulling out thereof with respect to the utility pole, the principal forces tending to pull out the nails 40 acting sidewise rather than longitudinally thereon, which sidewise forces the nails 40 can readily withstand without any appreciable loosening thereof with respect to the utility pole 10. While the strap 20 firmly holds the moulding 14 against the utility pole 10, the substantial width thereof serves to protect the moulding 14 in the sense that the moulding 14 will not be marked or scarred by the strap 20, although the moulding 14 may be formed of relatively soft material.

Figure 6:
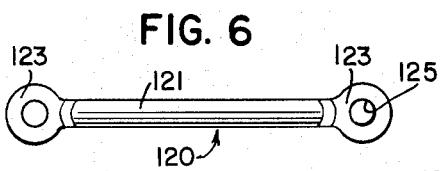
FIG. 6 is a plan view of the underside of the strap illustrated in FIG. 5.
Figure 5:
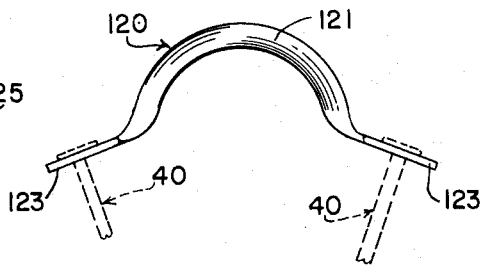
FIG. 5 is a side elevational view of a second embodiment of the strap useful in the mounting assembly of the present invention.

There is illustrated in FIGS. 5 and 6 of the drawings a second preferred embodiment of the strap forming a part of the improved mounting assembly of the present invention, the strap being generally designated by the numeral 120. The strap 120 includes a central holding portion 121 which is generally circular in cross section and arcuate in shape as viewed in FIG. 5, the normal radius of curvature of the holding portion 121 being somewhat greater than the radius of curvature of the exterior surface of the moulding 14 with which it is to be used. The arcuate extent of the holding portion 121 is slightly less than 180° at its normal radius of curvature.

Each end of the holding portion 121 has an integral attachment flange 123 thereon and extending therefrom at an obtuse angle, the attachment flanges 123 also being disposed at an obtuse angle with respect to one another. Each of the attachment flanges 123 is essentially circular in shape and has a major diameter approximately twice the diameter of the cross section of the holding portion 121 and is provided centrally thereof with an opening 125 therethrough for receiving fasteners such as the nails 40.

The strap 120 is used in the same manner as the strap 20 described above and is applied to the utility pole 10 to hold the moulding 14 in place thereon in a like manner. More specifically, the holding portion 121 of the strap 120 upon the application of the fasteners 40 through the attachment flanges 123 is drawn tightly about the moulding 14 and bent so that the radius of curvature thereof is substantially equal to the radius of curvature of the outer surface 15 of the moulding 14 so that the inner surface of the holding portion 121 contacts the outer surface 15 of the moulding 14 throughout the adjacent areas thereof, firmly to clamp the moulding 14 against the utility pole 10. The axes of the nails 40 are preferably driven so that they are substantially normal to the associated attachment flange 123 and are oriented essentially radially with respect to the associated utility pole so that the attachment flanges 123 are disposed generally tangent to the exterior surface 11 of the utility pole 10. The mounting assembly formed utilizing the strap 120 has the important advantages in mounting the moulding 14 upon the pole 10 that have been described above with respect to the mounting assembly including the strap 20.

While there has been described what are at present considered to be certain preferred embodiments of the invention, it will be understood that various modifications may be made therein, and it is intended to cover in the appended claims all such modifications as fall within the true spirit and scope of the invention.

What is claimed is:

1. In a moulding and strap assembly for supporting and protecting an electrical conductor or the like on the exterior surface of a supporting member such as a utility pole of generally circular cross section, a longitudinally grooved moulding member having a generally convex outer surface of a predetermined radius and a pair of support abutting surfaces connecting the outer surface and groove, a strap member formed of bendable sheet metal, said strap member including a curved bendable central holding portion having a predetermined normal radius of curvature greater than that of the outer surface of said moulding member, an attachment flange extending outwardly from each end of the holding portion with a predetermined obtuse angle with respect to each other and with respect to said holding portion, and each of said attachment flanges being provided with an opening for receiving a fastening means therethrough, the normal radius of curvature and arcuate length of said holding portion and the angularity of the attachment flanges being such relative to the radius of curvature and arcuate extent of said outer surface of the moulding member that, when the moulding and strap assembly are mounted on a supporting member by fastening means extending through said openings, the bendable holding portion is drawn tightly against the outer surface of the moulding member with the attachment flanges extending generally tangential to the exterior surface of the supporting member, thereby firmly to clamp the moulding member on the support with said abutting surface in tight engagement with said exterior surface.

2. A moulding and strap assembly as set forth in claim 1 in which the fastening means comprises an elongated member, and each of said attachment flanges is provided with a struck-out prong adjacent the opening in the flange positioned and shaped to guide the fastening means in a direction substantially normal to the flange, whereby when the assembly is mounted on a support, said fastening means are toed into the support.

References Cited by the Examiner

UNITED STATES PATENTS

| 1,341,113 | 5/1920 | Dottl et al. | 248—74 |
| 2,224,008 | 12/1940 | Auslander | 248—217 |
| 2,230,734 | 2/1941 | Van Antwerp | 174—45 |
| 2,310,434 | 2/1943 | Hyman | 248—71 |
| 2,334,700 | 11/1943 | Frey | 248—32 |
| 2,454,813 | 11/1948 | Larson | 248—32 |
| 2,570,957 | 10/1951 | Lee | 248—71 |
| 2,681,196 | 6/1954 | Lind | 248—71 |
| 2,689,702 | 9/1954 | Healey | 248—71 |
| 3,075,037 | 1/1963 | Schlein | 174—5 |

FOREIGN PATENTS

| 10,379 | 5/1912 | Great Britain. |
| 365,829 | 1/1932 | Great Britain. |
| 144,970 | 4/1931 | Switzerland. |

CLAUDE A. LE ROY, *Primary Examiner.*